United States Patent [19]

Maruska

[11] Patent Number: 4,637,095
[45] Date of Patent: Jan. 20, 1987

[54] METHOD AND APPARATUS FOR PEELING SAUSAGE

[76] Inventor: Gerald F. Maruska, 329 Cheyenne Trail, Madison, Wis. 53705

[21] Appl. No.: 808,269

[22] Filed: Dec. 11, 1985

[51] Int. Cl.⁴ .................. A22C 11/00; A22C 13/00
[52] U.S. Cl. .................................... 17/49; 17/1 F
[58] Field of Search ................................ 17/49, 1 F

[56] References Cited

U.S. PATENT DOCUMENTS

| 3,312,995 | 4/1967 | Garey | 17/1 F |
| 4,024,602 | 5/1977 | Stiles | 17/1 F |
| 4,138,767 | 2/1979 | Stiles | 17/1 F |
| 4,222,150 | 9/1980 | Andersen | 17/1 F |

Primary Examiner—Willie G. Abercrombie
Attorney, Agent, or Firm—Quarles & Brady

[57] ABSTRACT

A method and apparatus for removing the skin or casing of a sausage involves feeding the sausage through skewed feed rollers to cause the body to move both longitudinally and rotationally, cutting the casing on a nose portion of the sausage, positively gripping the knot or tuft on the forward end of the sausage with a pair of peeling rollers, moving the peeling rollers to a position tangent to the sausage feed path and then pulling the tuft and an attached portion of the casing through the peeling rollers and radially outward from the body to unwrap the casing in a helical pattern as the body is fed past the peeling mechanism.

13 Claims, 16 Drawing Figures

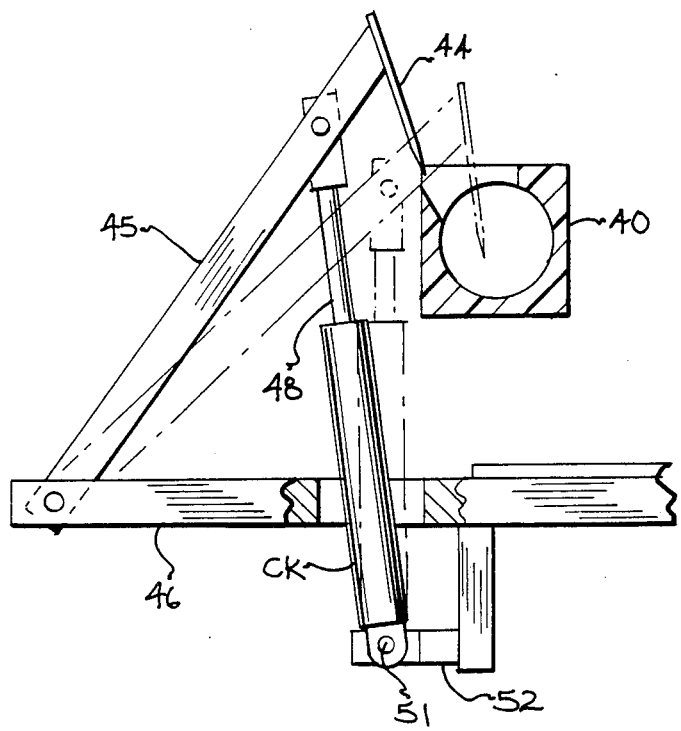
FIG. 4
FIG. 5
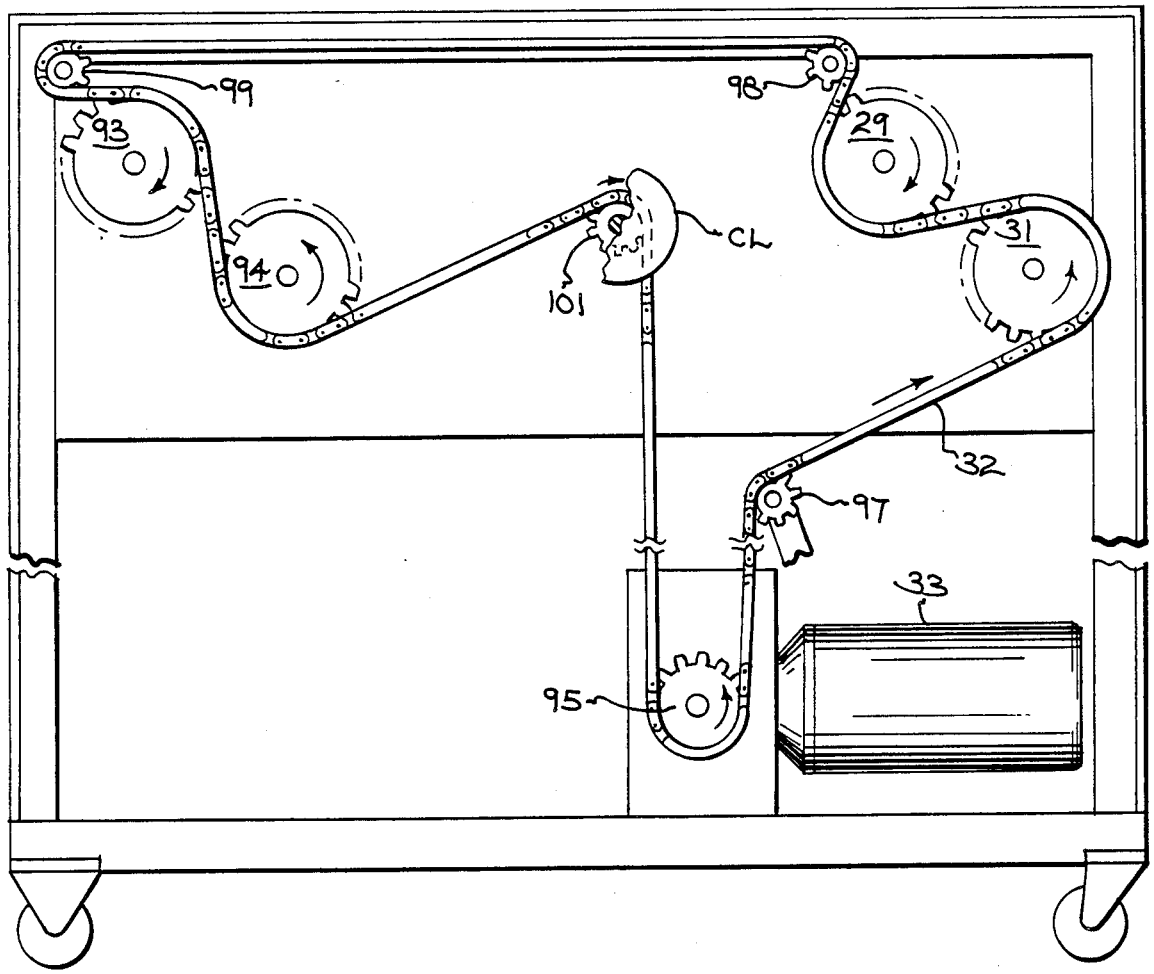

METHOD AND APPARATUS FOR PEELING SAUSAGE

BACKGROUND OF THE INVENTION

1. Field of the Invention

The field of the invention is meat processing equipment, and more particularly, equipment for removing natural or artifical casings from sausages.

2. Description of the Background Art

Sausages for human consumption come in a wide variety of compositions. Sausages are, generally speaking, elongated and cylindrical in shape—although they range greatly in size. When sausage is made, its ingredients are stuffed into a casing, which may be a natural casing or an artificial casing made of a synthetic material. The sausage is then cooked in one of many sausage-making processes. The result is generally an elongated, whole sausage or a chain of sausage links.

After producing the sausage, some post-processing may be desired before packaging. Thus, a large bologna may be cut into slices before being packaged as sandwich meat. An artificial casing on wieners may be removed to produce "skinless" wieners. And pepperoni may be skinned and sliced for use in pizza.

Small sausage and linked sausage can be made in natural or artificial casing. When these casings are edible, such sausages are sold and generally consumed with the casing. Larger sausage needs a stronger casing and is generally made in a fiber reinforced plastic casing. This casing adheres to the meat to varying degrees and may even break apart as it is removed from the body of the sausage. This happens particularly with dry sausage where the casing is made brittle by the drying process.

Removal of the fibrous casings may be facilitated by using "easy-to-peel" casings which are impregnated with additives that inhibit the adherence of the casing to the meat. The adherence may be so slight that in some cases, air injected into the casing can inflate it and release it from the meat entirely before the sausage is fed to a casing removal mechanism.

Two ways have been known to feed sausage into sausage processing machines. One is to feed the sausages longitudinally using feed rollers with axes of rotation that are transverse and perpendicular to the longitudinal axis of the sausage. This has been used with "easy-to-peel" casings. The other is to feed the sausage using feed rollers with skewed axes, so that the sausage is fed along a helical path. This has been used for regular casings.

With most casings, there is a hanging string at one end of the sausage. This string can be looped over a cross bar to allow the sausage to hang vertically. This string is also used when the sausage is fed into a sausage peeling machine. There the skin is slit along the full length of the sausage. A pair of peeling rollers are below the sausage feed path, and the hanging string is attracted to the peeling rollers by suction. The skin is then pulled through the rotating peeling rollers and the casing is progressively stripped from the body of the sausage as it is fed past the rollers.

Such a method may be suitable for removing "easy-to-peel" casings, where the casing is inflated by air injection and fully released from the body of the sausage before it is fed into the peeling mechanism. There have been several problems, however, in using such a method to remove casings from sausage. First, "easy-to-peel" casings are more expensive, and therefore, their use is resisted and limited to only a small percentage of the sausage that is produced. Second, slitting the casing for the full length of the sausage usually slits the body of the sausage also and is unacceptable to most producers. Third, air injection alone will not overcome the adherence of regular casings to meat and release them entirely from the sausage. Fourth, gripping the hanging string has not been an adequately reliable way of starting the peeling operation. And fifth, the addition of humidifiers to moisten the casings where they have become dry and brittle, has tended to wet the hanging string and cause it to become wrapped around and stuck to the outside of the casing, where it cannot be suitably attracted to the peeling rollers.

The need remains for better methods and equipment for peeling hard sausages. Such methods and equipment would be of commercial importance in providing sausage products in the form desired by food businesses and consumers.

SUMMARY OF THE INVENTION

The invention is practiced with a method and apparatus for more effectively removing the skin or casing of a sausage by positively gripping the knot or tuft found on the forward end of the sausage and then pulling it radially outward from the body of the sausage as it is fed along feed path.

When the above steps are performed in conjunction with feeding the sausage along a feed path, cutting the casing, encountering the sausage with a gripping mechanism, and pulling the tuft radially outward from the body of the sausage, the removal of the casing from a hard sausage is improved over previously known methods and machines.

It should be apparent that gripping the knot or tuft is somewhat more difficult than gripping the much longer hanging string. In a prior machine, the gripping rollers were positioned outside the sausage feed path, so as not to interfere with the feeding of the sausage. This required the attraction of the hanging string by suction. The invention provides a pair of gripping rollers that will engage the sausage head-on. Upon engagement, the gripping rollers are pivoted to a non-interfering position. As the body of sausage is fed past the gripping rollers, the casing is progressively removed and fed through the gripping rollers for disposal.

With the present invention, it is not necessary that the knife be positioned to cut along the full length of the sausage. It is enough that the knife is projected to gash the nose of the sausage. It can then be retracted before the remaining portion of the sausage passes by.

The invention is advantageously employed in a machine of the type where a sausage is fed both longitudinally and rotationally by pairs of skewed feed rollers, so that a reference point on a circumference of the sausage moves along a helical path. Then, when the gripping rollers pull the casing from the body of the sausage, the casing will be unwound or unwrapped along a generally helical path. Before the invention, this could not be reliably accomplished with regular casings.

These and other objects and advantages of the invention will be apparent from the following description and from the drawings, which describe and illustrate, by way of example, a preferred embodiment of the invention. The preferred embodiment is only an example, however, and the scope of the invention, which contemplates other embodiments as well, is to be determined by referring to the claims that follow the description.

BRIEF DESCRIPTION OF THE DRAWINGS

FIG. 4 is a sectional view taken in the plane indicated by line 4—4 in FIG. 1;

FIG. 5 is a rear elevational view of the machine of FIG. 1 with exterior parts broken away;

DETAILED DESCRIPTION OF THE PREFERRED EMBODIMENT

Figure 1:
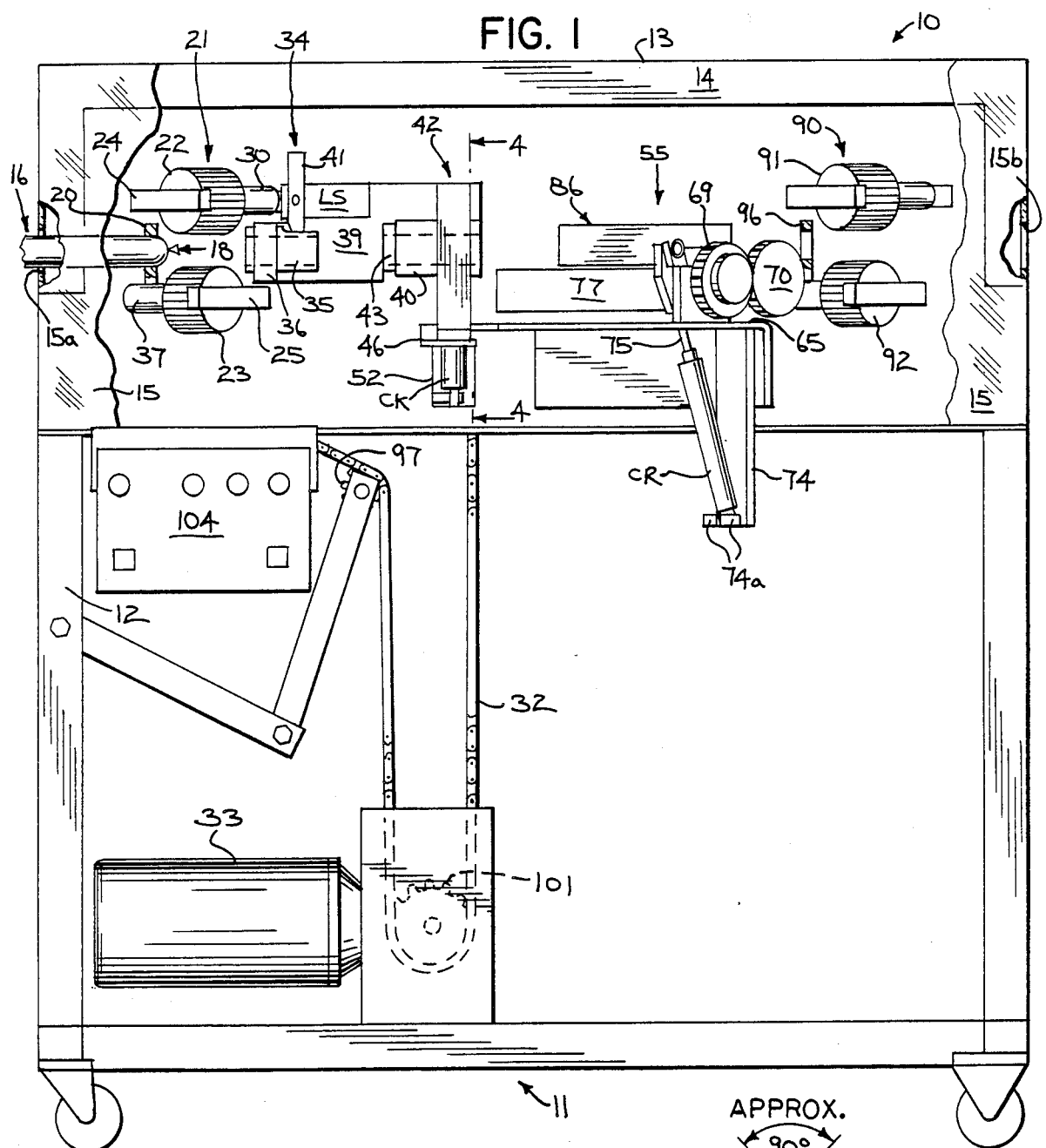
FIG. 1 is a front elevational view of the machine of FIG. 1 with exterior parts broken away.
Figure 2:
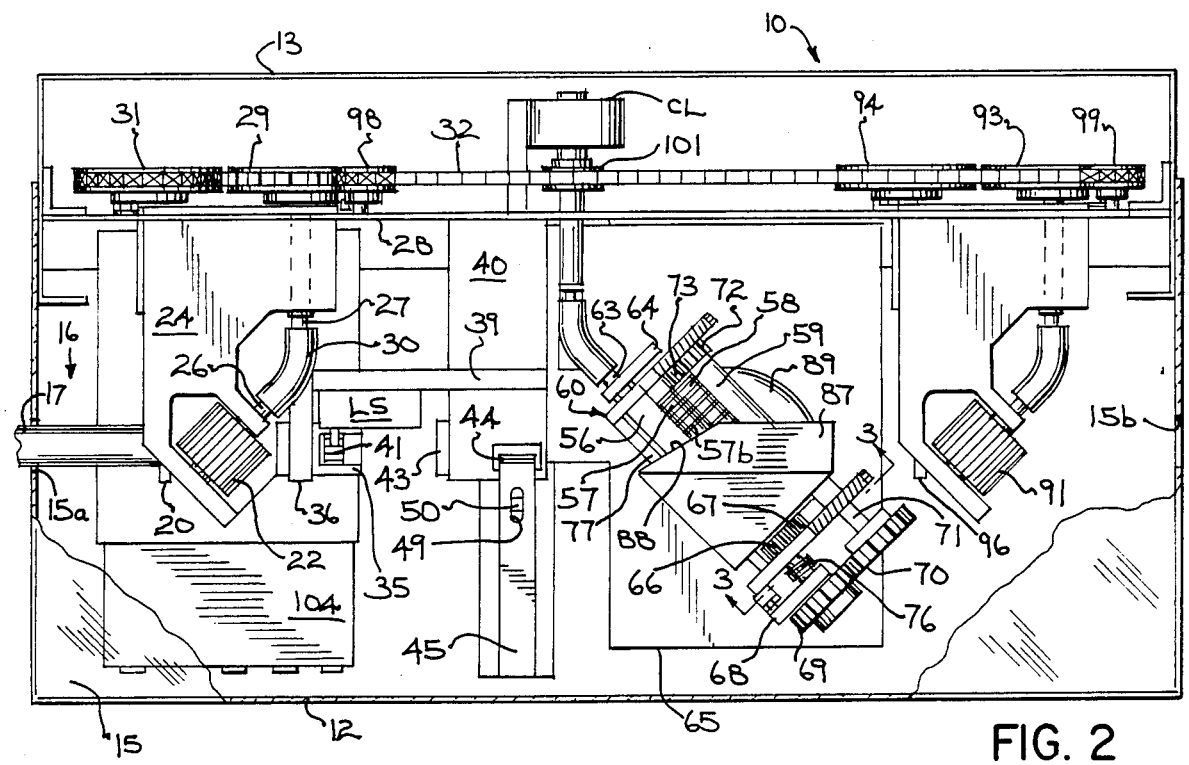
FIG. 2 is a top plan view of the machine of FIG. 1 with exterior parts broken away.

FIGS. 1 and 2 show a sausage peeling machine 10 that incorporates the method and apparatus of the present invention. The working parts of the machine 10 are enclosed within a cabinet 11 on wheels, the cabinet 11 including a front base portion 12 and a back portion 13 rising somewhat higher than the front base portion 11. The back portion 13 has a downwardly hanging lip 14 across its top and front, the lip 14 also extending down along opposite sides of the front but stopping somewhat short of the base portion 12. A transparent cover 15 extends forward from the high rising part of the back portion 13 along the top, sides and front of the cabinet 11 to complete the enclosure of the working parts of the machine 10, while still allowing observation of the sausage peeling operation.

In a sausage peeling operation a sausage 16 is fed horizontally into an entry side (the left side in FIGS. 1 and 2) of the machine 10 through an opening 15a in the transparent cover 15. The sausage emerges from an exit side (the right side in FIGS. 1 and 2) through a second opening 15b. The sausage 16 may be any one of a number of types such as salami or bologna processed in regular fibrous casings. Although the invention has been made in response to the need to peel regular casings, it is, of course, applicable to other types of casings as well.

Figure 3:
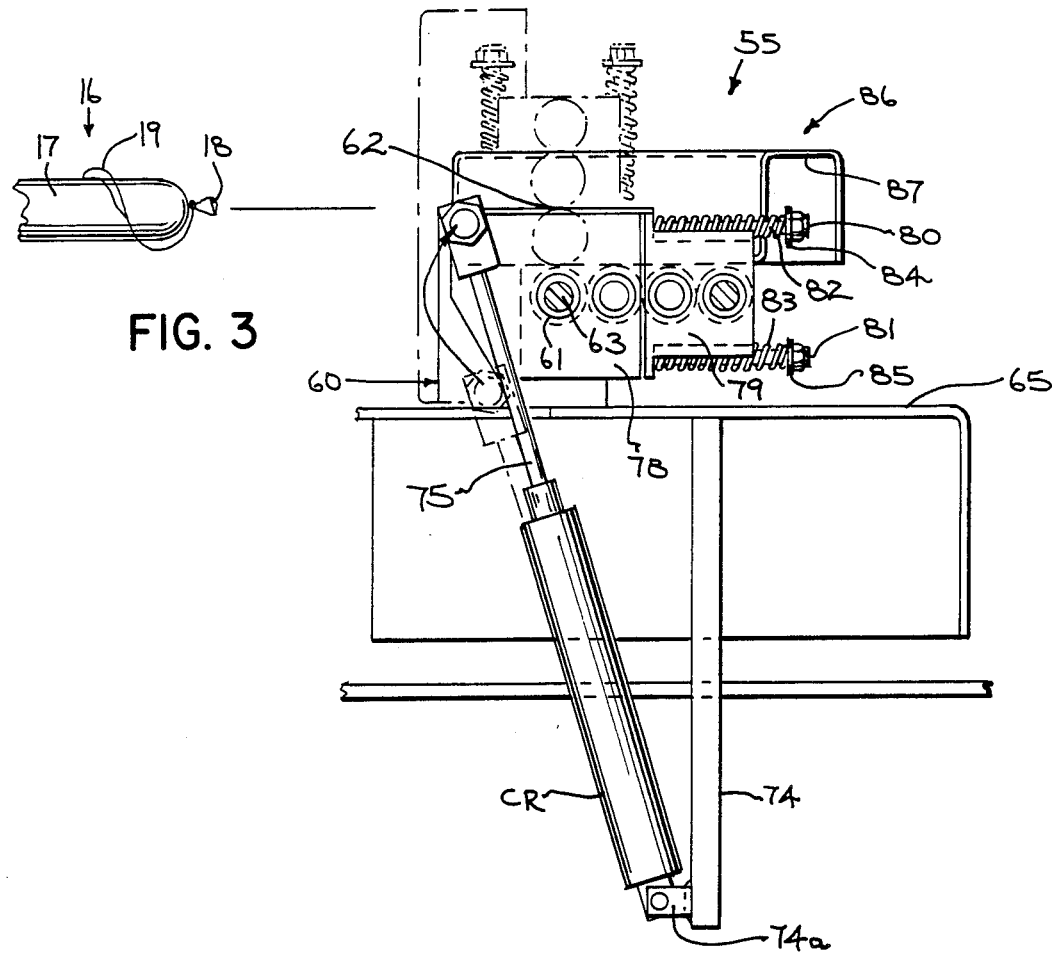
FIG. 3 is a sectional view taken in the plane indicated by line 3—3 in FIG. 2.

As seen in FIG. 3 the sausage 16 includes a body with an artificial casing 17 on the outside. The casing 17 is gathered at one end of the body to form a tuft 18. The sausage may also include a hanging string 19 that is tied around the tuft 18 and forms a loop for suspending the sausage from a bar. Initially, a leading end portion of the sausage 16 seen in FIGS. 1 and 2 is fed into the machine 10 by hand or mechanically with the tufted end becoming the leading end. The sausage 16 is stiff enough that it can be handled by its middle portion or its trailing end portion (out of view in FIGS. 1 and 2). The object of the sausage peeling operation is to remove the casing from the body of the sausage 16 so that the peeled body emerges from the exit side of the machine 10, ready for slicing and packaging.

The sausage 16 moves through the machine 10 along a sausage feed path, which extends from the entry side to the exit side, and which has a diameter corresponding to the diameter of the sausage being peeled. As the sausage 16 moves along this feed path in FIGS. 1 and 2, it first passes through a guide 20 with an opening large enough to accommodate the largest sausage that can be processed with the machine 10. Next, it encounters a first feeding station 21, which grabs the leading end of the sausage with stainless steel feed rollers 22 and 23 and mechanically feeds the sausage 16 along the feed path until its trailing end has passed the rollers 22 and 23.

Figure 14:
FIGS. 14-16 are detail sketches of the rollers of FIGS. 1 and 2.

The rollers 22 and 23 have teeth running parallel to their axes of rotation to frictionally grip the sausage 16 as the rollers 22 and 23 make rotating contact. The teeth on the rollers 22 and 23 have sharp edges as seen in FIG. 14 to better grip the casing on a sausage. The rollers 22 and 23 are also mounted in skewed relationship to the sausage feed path. The axis of rotation of roller 22 crosses the top of the sausage feed path at an angle 45° left of perpendicular as seen in FIGS. 1 and 2. The axis of rotation of roller 23 crosses the bottom of the sausage feed path at an angle 45° right of perpendicular as seen in FIGS. 1 and 2.

To achieve their orientation, the rollers 22 and 23 are mounted in yoke portions of roller support plates 24 and 25. The legs of each yoke portion are angled to run perpendicular to the desired axis of rotation. The upper roller 22 is mounted to rotate on bearings in the legs and is driven through drive shafts 26 and 27 and universal joint 30 which permits drive shaft 26 to be oriented at an angle relative to drive shaft 27. Drive shaft 27 is carried by a bearing in the upper support plate 24. The drive shaft 27 extends through an interior vertical wall 28 towards the back of the cabinet 11, where it connects to a toothed sprocket 29. The lower roller is powered through a similar drive train, including universal joint 37 seen in FIG. 3 and sprocket 31 seen in FIG. 1. The sprockets are driven by a chain 32 which transmits power from an electrical motor 33 in the bottom of the cabinet 11.

When feeding the sausage 16, the rollers 22 and 23 impart motion in longitudinal direction along a longitudinal axis of the sausage 16. At the same time they impart motion to rotate the sausage 16 around this axis. The result is that a reference point on any maximum diameter of the sausage 16 will move along a helical path. In this example, the sausage 16 is considered to be cylindrical, except for a rounded nose and a rounded tail at its extreme end portions. Therefore, the helical path is a cylindrical helical path. The invention is also applicable to sausages having any slight taper from one end to another, such that a reference point on a selected diameter would move along a conical helical path or spiral.

After passing through the feed rollers 22 and 23, the tufted leading end of the sausage 16 passes through a sensing station 34 that senses the approach of the sausage 16 towards other parts of the machine. This station 34 includes a guide tube 35 mounted in an opening in a guide support arm 36 projecting forward from a vertical plate 39. Behind the guide tube 35 a limit switch LS is mounted on the vertical plate 39. The vertical plate 39 extends to the right where it is mounted on a support block 40 projecting from the interior wall 28. The limit switch LS has a pivotable actuating arm 41 that hangs downwardly into the sausage feed path through an opening in the top of the guide tube 35. When the leading end portion of the sausage 16 encounters the actuating arm 41, it is pivoted to actuate the limit switch LS by closing a pair of contacts (not shown in FIGS. 1 and 2) to transmit an electrical current signal. When the trailing end portion of the sausage 16 passes the actuating arm 41, it returns to its original position and the contacts are opened to interrupt the electrical current.

After passing through the sensing station 34, the leading end of the sausage 16 moves downstream through a cutter station 42. This station includes a guide sleeve 43 mounted in an opening in the support block 40. A cutter assembly is positioned in front of the guide sleeve 43. As seen in FIG. 4 the cutter assembly includes a cutter blade 44 fastened to a movable cutter arm 45 that rises at an angle in the range of 30°-60° from horizontal. The lower end of the movable cutter arm 45 is pivotably mounted to a forward end of a fixed cutter support arm 46 projecting forwardly and horizontally from the interior wall 28. When the arm 45 is in the lower position, the blade 44 extends in a generally vertical downward direction through the opening in the guide sleeve 43. As the arm 45 is pivoted upward, the blade 44 moves along an arc to a retracted position.

The cutter assembly is pneumatically operated with an air cylinder CK that projects upwardly through a hole in the fixed arm 46. The air cylinder CK has an upwardly movable actuating rod 48 that is coupled in a slot 49 (FIG. 2) in the movable arm 45 by a pin 50 extending from left to right in FIG. 2. At its lower end seen in FIG. 4 the air cylinder CK has a tab with a hole in it. A pin 51 extends through the hole in a tab to support and hold the lower end of the cylinder CK in place. The pin 51 is mounted on a member 52 extending downwardly (see FIG. 1) from an attachment to the fixed arm 46. When pressurized air is admitted through a port (not shown in FIG. 4) at the upper end of the air cylinder CK, the rod 48 and cutter arm 45 move downward to place the cutter blade 44 in its first position in the sausage feed path. When pressurized air is admitted through a port (not shown in FIG. 4) at the lower end of the air cylinder CK, the rod 48 and cutter arm 45 move upward to retract the cutter blade 44 to its second position out of the sausage feed path.

Figure 13:
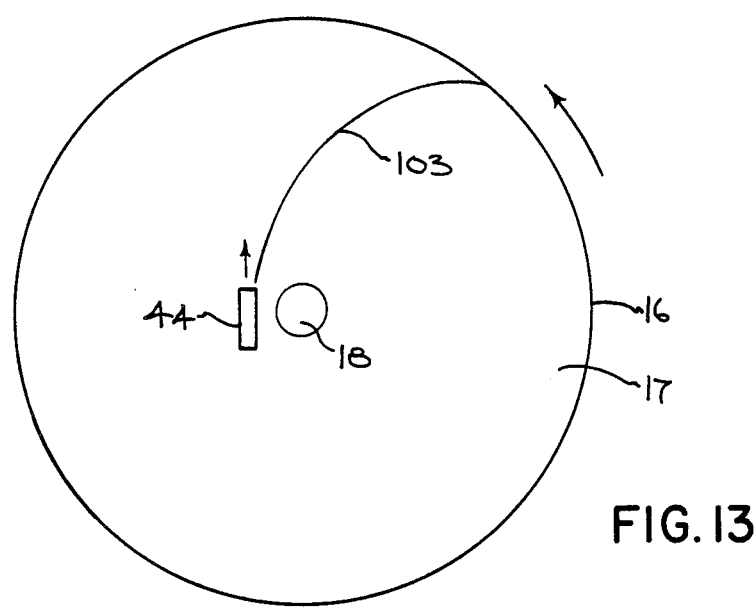
FIGS. 9-13 are schematics showing the operation of the parts of the machine shown in FIGS. 1 and 2.

When the leading end of the sausage 16 reaches the cutter station 42, the cutter blade 44 is in position to cut the casing on the nose of the sausage 16 near the tuft 18 as seen in FIG. 13. The cutter blade 44 is retracted over a short time period so that the cut line 103 is short and curving, the cut terminating where the rounded nose meets the full diameter portion of the sausage 16. Then the sausage 16 is fed further downstream along the feed path to encounter a gripping mechanism 55.

As shown in FIGS. 1 and 2 the gripping mechanism 55 is in its horizontal or "lay down" position—for a better view of its components. The gripping mechanism 55 includes four elongated, stainless steel rollers 56-59 seen in FIG. 2. These extend parallel to each other and are carried by frame 60 in bearings 61 (FIG. 3). The longitudinal axes of the rollers 56-59 and the frame 60 cross the bottom of the feed path at an angle of 45° to the right of perpendicular as viewed in FIGS. 1 and 2. The frame 60 can be pivoted around the longitudinal axis of the roller 56 as seen in FIG. 3 so that the rollers 56-59 are aligned vertically. In this second position, a nip region 62 where the rollers 57 and 58 bear against one another is at a height where it is aligned with the longitudinal axis of the oncoming sausage 16. The tuft 18 is located along this axis, and as the sausage encounters the rollers 57 and 58 in their vertical position, the tuft 18 will be gripped and held between the rollers 57 and 58. To assist this operation, the rollers 57 and 58 are formed with teeth as seen in FIG. 15.

Figure 15:
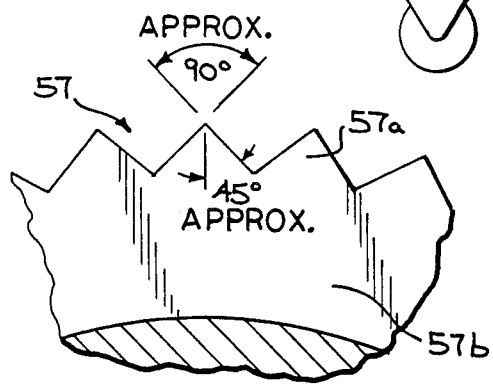

FIG. 15 shows a portion of roller 57 that is representative of rollers 57 and 58. The teeth 57a are cut to run longitudinally along the rollers 57 and 58. Each tooth 57a is formed of two faces oriented at an angle of 40°-45° from a radius of the roller 57 and at an angle of 80°-90° from one another. In FIG. 15, these angles are represented simply as approximately 45° and approximately 90°, respectively. The teeth 57a are disposed around the circumference of the rollers 57 and 58 which are divided into short longitudinal sections by circumferential grooves 57b seen in FIG. 2. These circumferential grooves 57b are cut to approximately four times the depth of the teeth, where the grooves meet a roller core represented by the shaded area in FIG. 15.

The rollers 56-59 are driven through a series of gears and a drive shaft mechanism 63 that extends through a vertical support plate 64 mounted on a peeling table 65. The drive shaft mechanism 63 is similar to that for rollers 22 and 23, but it also extends through bearings in the frame 60 to drive the first roller 56, which has a smooth exterior surface. A gear 66 on an opposite end of roller 56 meshes with a gear 67 on the adjacent end of the first grooved roller 57. The drive shaft 63 extends beyond the first gear 66, through the frame 60, and through a second vertical support plate 68 mounted on peeling table 65, to rotate a larger gear 69. This larger gear 69 meshes with gear 70, which is connected to a shaft 71 for driving the second smooth roller 59. Near the back end of the frame 60, the second smooth roller 59 has a smaller gear 72 mounted to rotate with it. This gear 72 meshes with gear 73 on the adjacent end of the second grooved roller 58, and thereby drives the roller 58.

The gripping mechanism 55 is pivoted from its upright position (seen in phantom in FIG. 3) to its horizontal position by an air cylinder CR. The air cylinder CR has a slidable actuating rod 75 that is bolted at its upper end to the upper left corner of the frontmost wall of the frame 60. This connection is also to the left of the first roller 56, so that when the rod is pushed upward the rollers are pivoted down to their horizontal position as illustrated in FIG. 3. The air cylinder CR has a tab with a hole in it at its lower end. A pin that is hidden by ear 74a extends through the hole in the tab to support and hold the lower end of the cylinder CR in place. The ear 74a is one of two ears welded on a member 74 that extends downwardly from an attachment to the peeling table 65.

When pressurized air is admitted through a port (not shown in FIG. 3) at the upper end of the air cylinder CR, the rod 75 moves upward to pivot the gripping mechanism 55 out of the sausage feed path. In this instance the force pushing up on the rod 75 is great enough to load a torsion return spring 76 seen in FIG. 2. This spring 76 is coiled around the extension of shaft 63 in between the frame 60 and plate 68. One end of the spring wire is anchored in the frame 60 while the other end is anchored in the plate 68. The air cylinder CR is operated only after the tuft 18 of the sausage 16 is gripped by the rollers 57 and 58, the rollers 57 and 58 maintaining that grip until they reach the horizontal position. When a sausage 16 has passed the gripping mechanism 55, the mechanism is returned to its upright position by allowing pressurized air to bleed back through the port at the lower end of the air cylinder CR. The action of the return spring 76 assures that the gripping mechanism 55 will return to its fully upright position.

When the gripping mechanism 55 is in its upright position, the grooved rollers 57 and 58 can be pushed apart to adapt to gripping the tuft 18 and nose of larger sausages. To explain how this is accomplished, an end portion of the frame seen in FIG. 3 shall be described, and it should be understood that the other end portion seen in FIG. 2 is of the same construction. The two end portions are connected by a plate 77 seen in FIGS. 1 and 2 that is vertical when the gripping mechanism 55 is in its horizontal position.

As seen in FIG. 3, the end portions of the frame 60 are each comprised of two blocks 78 and 79. The right block 79 is fastened to the left block 78 with long bolts 80 and 81 which project further than is necessary for simple fastening purposes. Compression springs 82 and 83 are coiled around the extending portions of the bolts 80 and 81 and are trapped between portions of the block 79 and retainers 84 and 85. The retainers 84 and 85 are in the nature of washers that are slipped on the bolts 80 and 81 up to their hex-head ends. The right block 79 is therefore slidable on the bolts 80 and 81, but it must move against the resistance of the springs 82 and 83. The left block 78 supports the first smooth roller 56 and the first grooved roller 57, while the right block supports the second grooved roller 58 and the second smooth roller 59. With this description it should now be understood how the tuft of an oncoming sausage can push the grooved rollers 57 and 58 (in their upright position) a short distance apart.

A cover 86 is mounted on top of the gripping mechanism 55 as seen in the position assumed in FIGS. 1 and 2. The cover has a channel portion 87 which covers the feed path on three sides as seen in FIGS. 2 and 3. When the gripping mechanism is pivoted to its upright position, the channel portion 87 is no longer aligned with the sausage feed path due to the angular disposition of the gripping mechanism 55. The channel portion 87, however, has a taper 88 at its entrance to assure that the channel portion 87 is positioned just ahead of the point where the sausage tuft 18 is gripped by the rollers 57 and 58.

Figure 9:
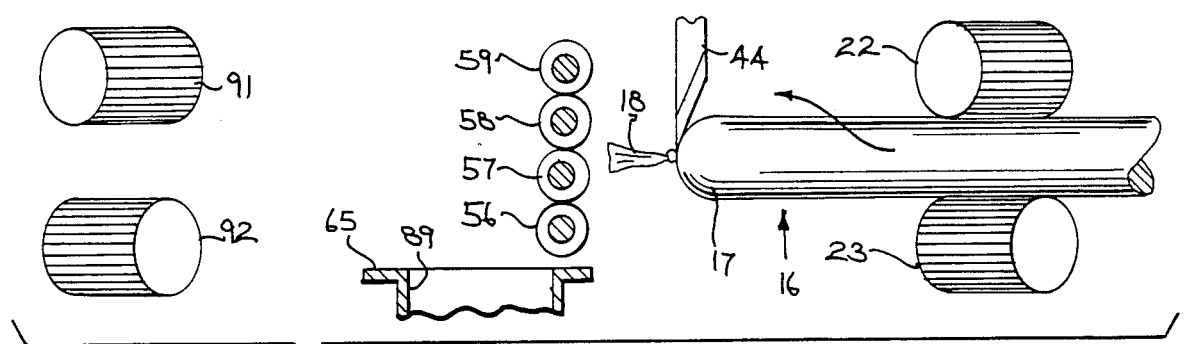
Figure 10:
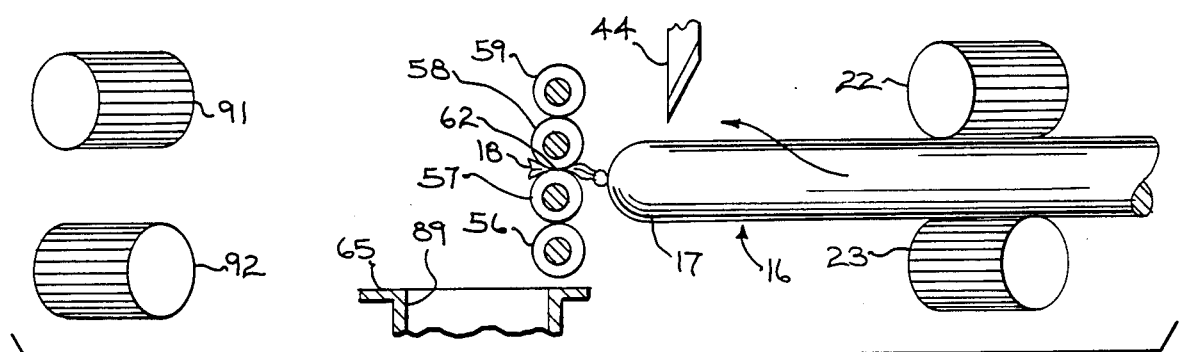

The removal of the casing 17 is illustrated schematically in FIGS. 9 through 12. In these figures, the parts of the machine 10 are viewed from the rear. Referring first to FIG. 9, the sausage 16 is fed forward (from right to left) and rotationally through the rollers 22 and 23 in the first feeding station 21. The cutter blade 44 is in its down position with an edge angled away from the oncoming sausage 16. The blade 44 cuts the sausage casing 17 from the vicinity of the tuft 18 to the region where the rounded nose portion meets a full diameter portion of the body. The cutter blade 44 is retracted a short time later so that the length of the cut is limited to the nose of the sausage 16. The gripping mechanism 55 is in its upright position so that as the sausage 16 is fed further along the feed path it encounters the gripping mechanism 55 head-on. As seen in FIG. 10, the tuft 18 is gripped between rollers 57 and 58, which are then rotating to pull the tuft 18 through the nip region 62. Pressure is increased in the air cylinder CR, as discussed above, to move the gripping mechanism 55 out of the way. As the gripping mechanism 55 is moved from its vertical to its horizontal position, its rollers 56-59 are stopped from rotating. However, the repositioning of the mechanism 55 begins a tear line that is a continuation of the cut line 103 in FIG. 13.

Figure 11:
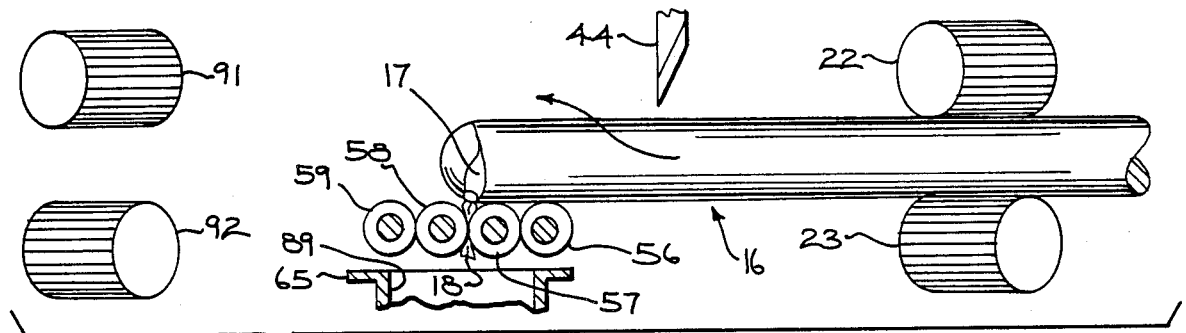
Figure 12:
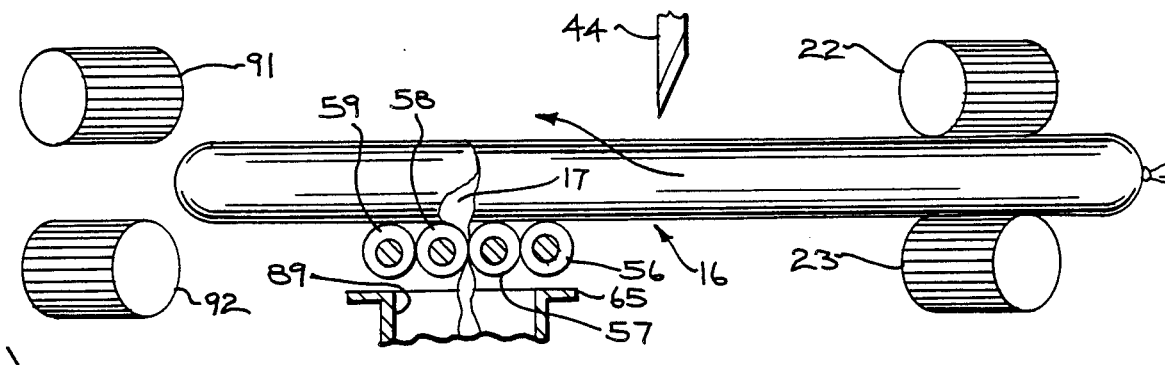

Referring next to FIG. 11, with the gripping mechanism 55 in its horizontal position, the rollers 56-59 are restarted to begin feeding the tuft 18 and an attached portion of the casing 17 down into a casing removal duct 89. Beneath the rollers 57 and 58, rakes (not shown) are positioned with tines that extend up into the grooves 57b of FIG. 15 to pick up the peeled casing 17 and keep it directed downwardly into the duct 89. The rakes also prevent the casing 17 from becoming wrapped around one of the rollers 57 or 58. As a result of rotating the sausage 16 as it is fed forward, the tear line follows a generally helical path along the sausage 16. This results in the casing 17 being unwound or unwrapped in a strip that follows a generally helical path. The peeled body of the sausage advances along the feed path, and through an opening in guide 96 in FIG. 1, to rollers 91 and 92 in a second feeding station 90. This station 90 is constructed in the manner described for the first station 21. The rollers 91 and 92 pull the trailing end of the sausage 16 past the gripping mechanism 55 as the sausage 16 is rotated, and this allows the removal of the casing 17 from the trailing end.

Figure 16:
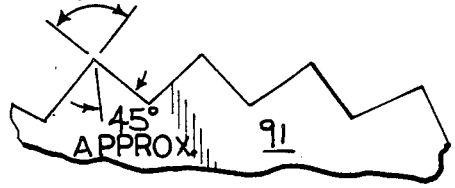

Referring again to FIGS. 1 and 2, the rollers 91 and 92 in the second feeding station 90 are mounted in the manner described for rollers 22 and 23, respectively, in the first feeding station 21. The rollers 91 and 92 have teeth of a different type than rollers 22 and 23. The teeth on rollers 91 and 92 are not as sharp as the teeth of rollers 22 and 23, so as not to dig into the peeled sausage. As seen in FIG. 16 the opposing faces of each tooth are formed at an angle of 80°-90° from one another, and at an angle of 40°-45° from a radius intersecting the apex of the tooth. In FIG. 16, these angles are represented simply as approximately 90° and approximately 45°, respectively. The upper roller 91 is driven through a sprocket 93 seen behind the wall 28 in FIG. 5, and the lower roller is driven through a sprocket 94. These sprockets 93 and 94 are connected to drive the rollers 91 and 92 through drive shafts and couplings like those described for rollers 22 and 23.

The chain-drive transmission for the machine 10 is illustrated in FIG. 5. The electrical motor 33 powers a drive sprocket 95. The chain 32 runs around the underside of this sprocket 95, and over idler sprocket 97 which provides an angle so that enough of the driven sprocket 31 for the lower roller 23 in the first feed station 21 is engaged. The chain 32 then loops around the underside of the driven sprocket 29 for the upper roller 22 in the first feed station 21 and around two idler sprockets 98 and 99 to approach the top of the driven sprocket 93 for the upper roller 91 in the second feed station 90. From there, the chain 32 loops around the underside of the driven sprocket 94 for the lower roller 92. It then runs over the topside of a driven sprocket 101 for the gripping rollers. This sprocket 101 is coupled to the drive shaft mechanism 63 for the gripping rollers through an electromagnetic clutch CL. From there, the chain 32 runs back to the drive sprocket 95 on the motor 33.

Figure 6:
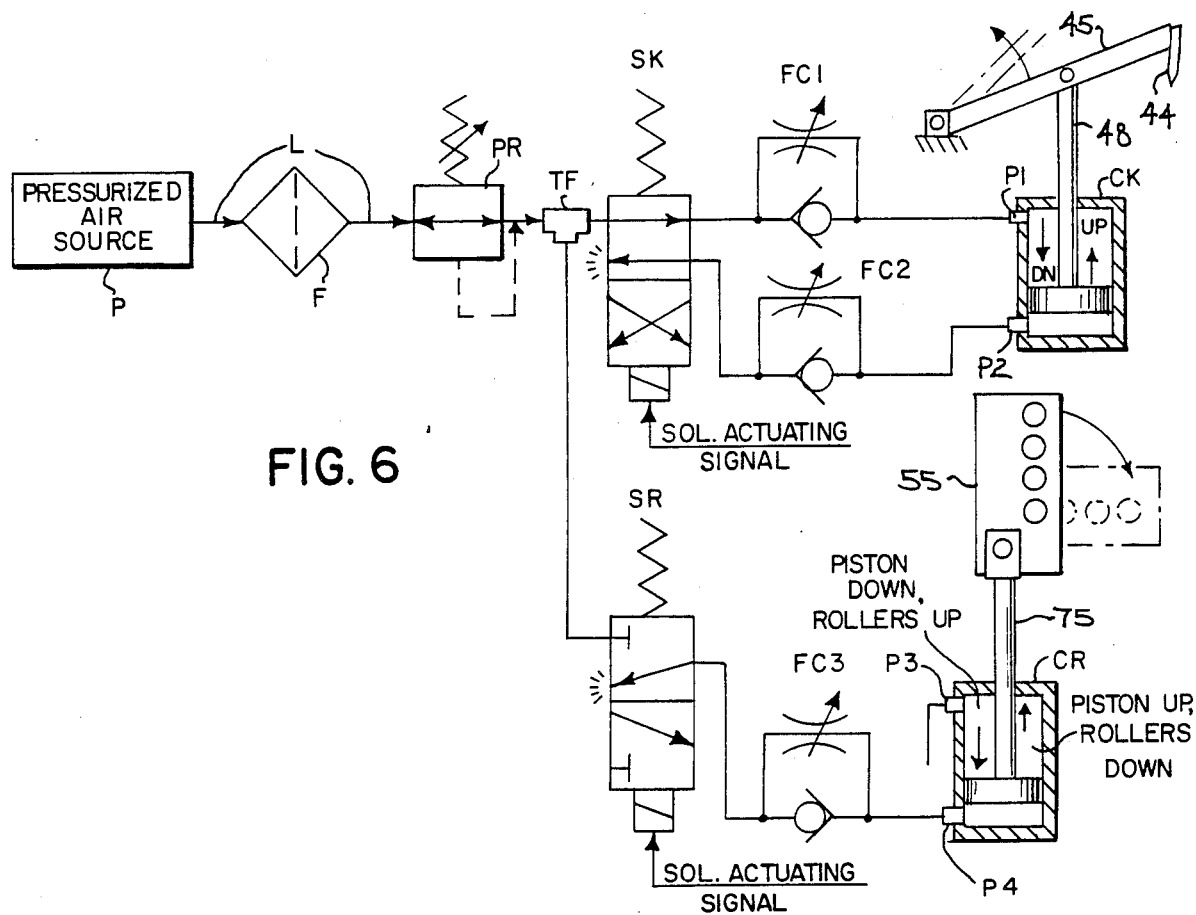
FIG. 6 is a schematic of the pneumatic control circuit incorporated in the machine of FIGS. 1 and 2.

The pneumatic apparatus for operating the air cylinders CK and CR seen previously in FIGS. 1 and 2 is illustrated in FIG. 6. Air at suitable pressure is supplied from a source P through air lines L, filter F, pressure regulator PR and a T-fitting TF to a pair of solenoid-actuated, multiple port, two-position spool valves with spring return, these valves being identified as valve SK and valve SR in FIG. 6.

Valve SK controls the flow of air to the air cylinder CK for moving the cutter blade 44 up and down. The valve SK is connected to upper and lower ports P1 and P2 on the cylinder CK through flow control valves FC1 and FC2, respectively. As seen in FIG. 6, the valve SK is in its spring return, solenoid-deactuated position, air from the pressure regulator PR flows through a supply inlet port and a second port in valve SK to valve FC1. A check valve portion of the valve FC1 pops open to admit a surge of air into the cylinder 47 to move the piston downward. The adjustable orifice portion of valve FC2 controls the flow out of the lower port of the cylinder CK and back through a third port and a second passage in valve SK to an exhaust port. The piston is connected to the actuating rod 48, and in the position seen in FIG. 6, the cutter blade 44 is moved into the sausage feed path.

When the solenoid on valve SK is energized, the crisscross pair of passages are moved up to reverse the connections between the ports. Air from the pressure regulator PR then flows from the supply inlet port to the third port and pops open the check valve portion of valve FC2 to admit a surge of air into the lower port P2 in the cylinder CK. This moves the piston, the actuating rod 48 and the cutter blade 44 up quickly, and then more slowly as the pressure on the other side of the piston is released through the adjustable orifice in valve FC1.

In its down position, the cutter blade 44 is positioned ⅛ inch to ¼ inch to the left of the tuft 18 as seen in FIG. 13 and about ¼ inch below the tuft 18. The cutter blade 44 first splits the casing on the rounded nose of the sausage 16, and as the cutter blade 44 is moved upward, the counterclockwise rotation of the sausage 16 causes the cut to follow a spiral path 103. The upward movement of the cutter blade 44 is timed so that the blade 44 leaves the sausage before cutting into the cylindrical portion of the body.

Returning to FIG. 6, valve SR is seen in its spring return, solenoid-deactuated position. Air from the pressure regulator PR is blocked at a first port from passing through the valve SR. Air in the cylinder CR is allowed to bleed through a port P4 below the piston and through an adjustable orifice in flow control valve FC3. The air enters a second port in valve SR and passes to an exhaust port. The upper port of the cylinder CR is vented to the atmosphere, so that as pressure is equalized on the opposite sides of the piston, gravity will pull the piston downward. With the valve SR in the position in FIG. 6, the gripping rollers 57 and 58 move to their vertical position, aided by the torsion spring 76 and a pivoting action developed by the drive arrangement of the mechanism 55.

When the solenoid on valve SR is energized, the lower set of passages are moved up (schematically) so that the first port is now connected to the second port and the exhaust port is blocked. Now pressurized air is supplied through the check valve portion of flow control valve FC3. This air enters the lower port P4 in cylinder CR and moves the piston and the actuating rod 75 upward. This pivots the gripping mechanism 55 down to its horizontal position, and loads the torsion spring 76. The upper port P3 in cylinder CR is vented to the atmosphere and air is evacuated from the upper side of the piston as it moves upward.

The timing of the operation of the machine is controlled by electrical circuitry located in a control box 104 seen in FIGS. 1 and 2. The details of this circuitry are represented schematically in FIG. 7 as a ladder diagram, in which the left upright represents a voltage signal at 120 AC volts and a frequency of 60 hertz. The right upright represents zero volts or ground potential. Each rung is a circuit that carries current only when all switches and open contacts in the rung are closed so as to complete a path from the left upright to the right upright.

Figure 7:
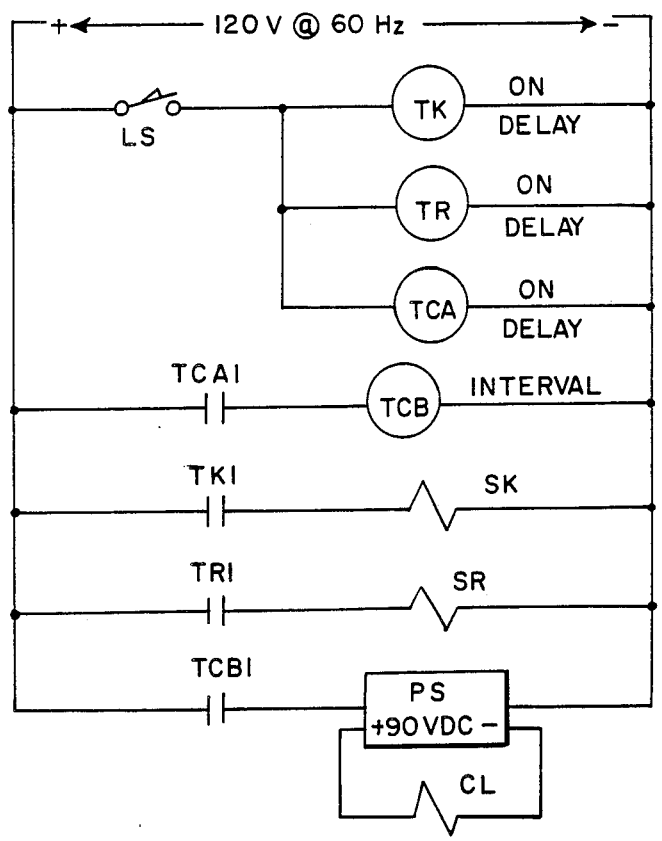
FIG. 7 is a schematic of the electrical control circuit incorporated in the machine of FIGS. 1 and 2.

The limit switch LS discussed earlier in relation to FIGS. 1 and 2 is connected in series with each of the coils TK, TR and TCA in FIG. 7, which are parts of three "on delay" timers. These coils control respective sets of normally open contacts TK1, TR1 and TCA1, also seen in FIG. 7. The limit switch LS is actuated by the nose of the sausage. The time when this occurs is the zero or reference time in the timing diagram of FIG. 8. The contacts TK1 are closed after a first time delay period T1 and this energizes the solenoid of valve SK to retract the cutter blade 44 to make the cut described earlier. The retraction follows the response curve of cylinder CK in FIG. 8 as it extends its actuating shaft as represented by the abbreviation EXT.

Returning to FIG. 7, the energizing of coils TR and TCA causes contacts TR1 and TCA1 to close after a longer time delay of period T1 and period T2. The closing of contacts TR1 energizes the solenoid of valve SR to pivot the gripping mechanism 55 to its horizontal position. Thus, timer TR must be set for a delay long enough for the tuft of the sausage to reach and be gripped by the gripping mechanism 55. The closing of contacts TCA1 energizes the coil TCB of an interval timer to close the contacts TCB1. This provides a signal to a power supply (PS) for the electromagnetic clutch (CL) seen earlier in FIG. 5. This signal causes the clutch (CL) to disengage and stop the rollers 56–59 in the peeling mechanism 55 from rotating as the mechanism 55 is moved from its vertical to its horizontal position. The interval timer TCB times out after time period T3 in FIG. 8 and the contacts TCB1 are opened to cause the clutch (CL) to re-engage and transmit power to the rollers 56–59.

Figure 8:
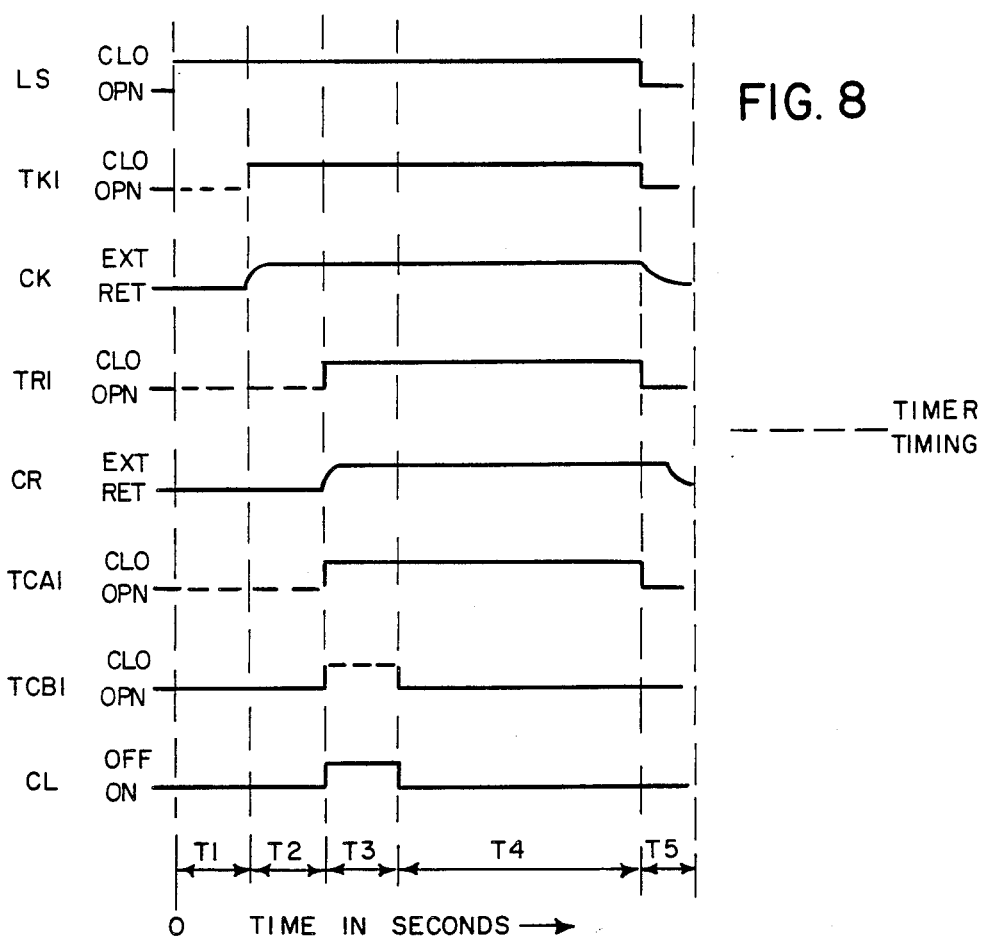
FIG. 8 is a timing diagram for the control circuits of FIGS. 6 and 7.

The trailing end of the sausage passes the limit switch LS after additional period T4. This causes the limit switch contacts LS to open and to de-energize coils TR and TK. This in turn causes contacts TK1 and TR1 to open and de-energize valves SR and SK. Finally, de-energizing valves SR and SK produces the response of cylinders CK and CR as illustrated in FIG. 8. At the end of the response time T5 the cutter blade 44 is in its position in the sausage feed path and the mechanism 55 is in its vertical position to meet the next sausage.

While the details of a preferred embodiment have been described as a mode of carrying out the invention, other embodiments may also be provided to carry out the invention, and these embodiments are also covered by the following claims.

I claim:

1. A method for removing a casing from a body of a sausage having a leading end and a trailing end, wherein the casing is formed with a tuft on the leading end of the body, the method comprising:
    feeding the body of the sausage forward along a feed path through a feeding station;
    causing a cut to be made in the casing;

at a casing removal station downstream of the feeding station, encountering the leading end of the sausage head-on, gripping the tuft of the sausage, and then pulling the tuft radially outward from the body of the sausage to separate the casing from the body as the body is fed further along the feed path; and feeding the trailing end of the body past the casing removal station to allow removal of the casing from the trailing end of the sausage.

2. The method of claim 1, wherein the tuft of the sausage is gripped with a gripping mechanism, and further comprising the step of moving the gripping mechanism from a first position in the sausage feed path to a second position out of the sausage feed path to pull the tuft radially outward from the body.

3. The method of claim 1, wherein the sausage is encountered with a pair of gripping rollers oriented with their axes of rotation at an acute angle relative to the sausage feed path.

4. The method of claim 1, wherein the body of the sausage is fed longitudinally and rotationally relative to the feed path to unwrap the casing from the body of the sausage along a generally helical path.

5. The method of claim 1, wherein the cut is made along an arcuate path and is limited to a rounded nose portion on the leading end of the sausage.

6. A machine for removing a casing from a body of a sausage, wherein the casing is formed with a tuft at one end of the body, the machine comprising:

first feed means for feeding the body of the sausage forward along a feed path with the tuft leading the body of the sausage;

cutting means, located along the feed path downstream of the first feed means, for making a cut in the casing;

gripping means, positioned along the feed path downstream of the first feed means, for gripping the tuft of the sausage, the gripping means being movable between a first position in which the gripping means encounters and grips the tuft of an oncoming sausage and a second position in which the gripping means is moved out of the way of the sausage, after the casing has been cut, the gripping means also pulling on the tuft and on an attached portion of the casing in the second position to progressively remove the casing from the body as the body is fed further along the feed path; and second feed means, located along the feed path downstream of the gripping means, for feeding a trailing end of the body past the gripping means, to allow the removal of the casing from the trailing end.

7. The machine of claim 6, wherein the first feed means and the second feed means operate to feed the body of the sausage longitudinally and rotationally relative to the feed path.

8. The machine of claim 6, wherein the gripping means includes a frame and a pair of gripping rollers rotatably mounted in the frame, the frame being pivotably mounted to pivot the gripping rollers between the first position in which a nip region between the rollers is aligned with the tuft of the oncoming sausage and the second position in which the gripping rollers are moved out of the way of the sausage.

9. The machine of claim 8, wherein the frame and the gripping rollers are elongated and are oriented longitudinally at an acute angle across the feed path in the first position and at an acute angle relative to the feed path in the second position.

10. The machine of claim 6, wherein the gripping means is disposed at an acute angle across the feed path in the first position and at an acute angle relative to the feed path in the second position.

11. A machine for peeling a sausage of the type having a body and a casing on the body, wherein the casing is formed with a tuft at one end of the body, the machine comprising:

first feed means for feeding the body of the sausage forward along a feed path and rotationally, so that a location on a circumference of the body moves along a helical path;

sensing means, located along the feed path downstream of the first feed means, for sensing approach of the sausage towards other parts of the machine;

cutting means, located along the feed path downstream of the sensing means, for making a cut in the casing;

gripping means, positioned along the feed path downstream of the first feed means, for gripping the tuft of the sausage, the gripping means being movable between a first position in which the gripping means encounters and grips the tuft of an oncoming sausage and a second position in which the gripping means is moved out of the way of the sausage after the casing has been cut, wherein the gripping means also pulls on the tuft and on an attached portion of the casing when moved to the second position to unwrap the casing from the body as the body is fed further along the feed path; and second feed means, located along the feed path downstream of the gripping means, for pulling a trailing end portion of the body past the gripping means, and rotationally, to allow the unwrapping of the casing from the body of the sausage.

12. The machine of claim 11, further comprising actuating means for pivoting the gripping means from the first position to the second position in time delayed response to the sensing of the sausage by the sensing means.

13. The machine of claim 12, further comprising:

means for driving the gripping means;

further comprising clutch means for coupling and decoupling the means for driving the gripping means; and further comprising clutch control means for operation in time delayed response to the sensing of the sausage by the sensing means to decouple the means for driving the gripping means as the gripping means is moved from the first position to the second position and to couple the means for driving the gripping means upon reaching the second position to cause removal of the casing from the body of the sausage.

* * * * *